3,684,740
REGENERATION OF PLATINUM GROUP METAL-ALPHA ALUMINA CATALYST
Robert N. Cimbalo, Homewood, and Allen R. Broyles, Midlothian, Ill., assignors to Atlantic Richfield Company, New York, N.Y.
No Drawing. Filed June 10, 1969, Ser. No. 832,010
Int. Cl. B01j 11/18, 11/04
U.S. Cl. 252—416                11 Claims

ABSTRACT OF THE DISCLOSURE

A new method for regenerating a hydrogenation or dehydrogenation catalyst of a platinum-group metal on alpha-alumina is disclosed. The reactor containing the catalyst is first heated with an oxidizing gas to burn off deposited carbonaceous material. After the burning, the catalyst is cooled and washed with liquid phase water for a time sufficient to remove impurities. This burn and water-wash regeneration procedure can restore the catalyst activity and selectivity to substantially virgin levels.

---

This invention is a novel method for regenerating a platinum group metal-alpha-alumina catalyst used in converting a hydrocarbon feedstock in the presence of hydrogen, e.g., hydrogenation or dehydrogenation, preferably hydrogenation, to restore the catalyst activity and selectivity to a significantly higher level and even to substantially virgin levels. In particular, this invention relates to a novel method for regenerating an acetylene hydrogenation unit catalyst used for the selective removal of $C_4$-acetylenes from butadiene-rich streams.

In the operation of a catalytic hydrogenation unit, the catalyst selectivity greatly declines due to the deposition of polymer species and possible other poisons on the catalyst. This necessitates periodic regeneration to remove these polymer species and poisons and thus restore catalyst selectivity. Regeneration of hydrogenation-dehydrogenation catalysts is well-known and can be carried out by a number of processes. All of these processes generally include a burnoff step to remove carbonaceous material wherein the catalyst is subjected to the action of a gas as, for example, steam or other inert gas, containing a minor amount of oxygen at a relatively high temperature, say about 700 to 1000° F., to oxidize and burn off deposited carbonaceous material. Regeneration can be carried out, for example, by removing the reactor from the plant stream, heating with a gas such as methane to about 250° F. and then heating the bed to a temperature of about 650–850° F. with steam. Air is then added to the steam and the effluent temperature controlled from 800 to about 1000° F. for a time until no exotherm is evident which generally takes place in about ½ to 3 hours. The reactor is then cooled with steam to about 300° F. and then cooled with methane to about 120° F. Then the reactor is returned to the process. Another inert gas may also be used instead of the steam in the regeneration process.

It has been found that the catalyst activity and selectivity can often be returned to nearly virgin levels by this regeneration; however, after several such regenerations, the catalyst can lose all hydrogenation activity. In such case, the catalyst charge must be dumped and replaced with virgin catalyst. It has now been found that if the regeneration procedure is modified to include a water-wash of the catalyst bed after the burning stage, the catalyst activity and selectivity can be returned to a significantly higher level, even approaching virgin levels, for additional periods of time. Thus, the necessity for replacement of the catalyst charge is greatly diminished offering considerable saving in the cost of catalyst and in the down time of the reactor.

This invention is particularly applicable for the regeneration of an acetylene hydrogenation unit catalyst wherein acetylenic hydrocarbons are selectively removed from a hydrocarbon diene-rich stream. Purification of butadiene-rich streams to remove $C_4$-acetylenes is known in the art. See, for example, U.S. Pats. 3,281,489 and 3,342,891. In the former patent, for example, the butadiene-rich stream is treated first to selectively hydrogenate the acetylenes present and then the hydrogenation product is treated to effect aldol condensation of carbonyls with neither step adversely hindering the result of the other step. In the latter patent, the butadiene-rich stream is fractionated to provide a first fraction having a higher concentration of acetylenes and a second fraction having a lower concentration of acetylenes. The first fraction is treated to selectively hydrogenate the acetylenes and then the two fractions are recombined to obtain a stream with a greatly reduced acetylene content. These, and other purifications are necessary because of the known deleterious effects of acetylenes on the chemical, particularly polymerization, processes involving alkadienes. Purification by selective hydrogenation can result in a higher concentration of alkadienes because of their formation in the hydrogenation of the acetylenes and the minimal loss of alkadiene by hydrogenation. Further details are available in the prior art, including the two above-mentioned patents.

The catalyst used in an acetylene hydrogenation unit often has an alpha-alumina support in the shape of spheres, balls, rods, cylinders or the like. When the catalyst is macrosize and is used as a fixed bed the catalyst is generally in a size range of from about 1/64 to ½ inch in diameter, and say up to about 1 inch in length, preferably about ⅛ to ½ inch in length. The support carries a minor catalytic amount, for instance, about 0.01 to 2 weight percent, preferably 0.05 to 0.1 weight percent of a platinum group metal such as palladium, rhodium or platinum. Palladium is particularly preferred.

Tests were run to confirm the activity loss of such commercial catalyst material and to show that these losses were not due to incomplete burn-off of carbonaceous material. The catalyst material was 0.1 weight percent palladium on 5/64 inch alpha-alumina spheres and this catalyst was used in the $C_4$-acetylene removal from a butadiene-rich stream. The predicted values are determined from a kinetic model developed to depict the operation of the system and they vary due to changes in the particular operating conditions chosen. The results of these tests are shown in Table I. It should be noted that the regenerated catalysts performed substantially below the predicted levels in the hydrogenation removal of acetylene from a butadiene-rich stream. The commercially regenerated catalyst was regenerated in a steam-air mixture by a procedure as outlined before. The muffle furnace regenerated catalyst was heated at 900° F. for six hours in a standard laboratory muffle furnace.

A sample of the discharged catalyst was subsequently washed in distilled water and the activity checked against predicted levels in a similar $C_4$-acetylene removal from a butadiene rich stream. The water-washed catalyst was first subjected to a steam-air regeneration as outlined above. The use of distilled water rather than tap water is preferred since the latter may contain impurities which may become deposited in the catalyst bed and which may be detrimental to the process reactions. The wash water is preferably distilled but can also be any water in which sulfate ions, $SO_4^=$, or other harmful ions are present at a level low enough not to have deleterious effects on the hydrocarbon reaction. The concentration of the possibly harmful ions in the wash water thus should be essentially nil although the presence of other nonharmful ions is not disadvantageous. The wash water can be conveniently supplied at a rate of from about ½ to 20 L.H.S.V., preferably 3 to 7 L.H.S.V. The wash is continued for a time sufficient to remove water soluble impurities as indicated by a relatively clear wash water stream coming from the catalyst washing operation. Generally, the stream is relatively clear after the catalyst bed is washed for one hour, but this may occur in a lesser time. Successful practice has included washing for at least about 15 or 30 minutes after the stream is clear to the eye. The water should pass on a once-through basis through the fixed catalyst bed and in either an upflow or downflow direction. Recycling of the wash water will re-introduce the impurities removed unless the recycle stream is purified or suitably diluted. The wash can be performed at a temperature which provides at least part of the water in the liquid phase, for instance, about 40 to 250° F., preferably about 75 to 110° F. After the water-wash, the reactor and lines can be dried with hot inert gas, cooled, if desired, with inert gas, purged and returned to hydrocarbon processing.

Results obtained in this catalyst reactivation are shown below in Table I. Table I also shows the results of similar tests performed on virgin catalyst. The latter data are included for comparison with the data on discharged, regenerated (carbonaceous material removed) and water-washed catalyst. The results clearly show that the water-washed catalyst activity has been restored to a level approximating that of virgin catalyst.

with liquid-phase water whose contents of sulfate ion and other ions which are harmful to the catalyst, are sufficiently low as not to be deleterious to the usefulness of the catalyst in said hydrogenation, to remove water-soluble impurities from the catalyst, the burning and washing being conducted for times sufficient to restore activity and selectivity to the catalyst.

2. The method of claim 1 in which the platinum group metal is palladium.

3. The method of claim 2 wherein the water is distilled.

4. The method of claim 2 wherein the water is contacted with said catalyst for at least about 15 minutes after the wash effluent is clear.

5. The method of claim 4 wherein the water is distilled.

6. A method for regenerating platinum group metal-alpha alumina catalyst employed in the selective hydrogenation of acetylenic hydrocarbons in a hydrocarbon diene-rich stream, in the presence of hydrogen to restore activity and selectivity to the catalyst which comprises burning from the catalyst carbonaceous material deposited thereon during use in said selective hydrogenation by heating the catalyst to about 650 to 850° F. with steam, contacting the catalyst with air and steam to raise the temperature of the effluent from the catalyst to about 800–1000° F., and maintaining contact of the catalyst with air until no exotherm is evident, cooling the catalyst and washing the cooled catalyst with liquid phase water whose contents of sulfate ion and other ions which are harmful

TABLE I

| Sample | Feed I | Discharged commercial catalyst | | Muffle furnace regenerated | | Virgin catalyst using Feed I | | | | | Feed II | Water washed catalyst | | | |
|---|---|---|---|---|---|---|---|---|---|---|---|---|---|---|---|
| | | Run Number— | | | | | | | | | | Run Number— | | | |
| | | 1 | 2 | 3 | 4 | 5 | 6 | 7 | 8 | | | 9 | 10 | 11 | 12 |
| H₂/vinyl acetylene mole ratio | | .95 | .40 | .83 | 1.03 | .31 | .69 | .86 | 1.13 | | | .66 | 2.3 | 3.5 | 5.0 |
| Stream analysis, weight percent: | | | | | | | | | | | | | | | |
| Vinyl acetylene | 2.91 | 2.65 | 2.53 | 2.58 | 2.57 | 2.38 | 1.81 | 1.69 | 1.24 | | 0.58 | 0.44 | 0.34 | 0.32 | 0.29 |
| Ethyl acetylene | 1.10 | 1.09 | 1.07 | 1.12 | 1.08 | 1.02 | .95 | 1.00 | .81 | | 0.60 | 0.54 | 0.50 | 0.50 | 0.49 |
| Butadiene | 83.09 | 82.55 | 82.85 | 82.51 | 83.37 | 83.30 | 83.25 | 82.64 | 83.43 | | 48.27 | 46.09 | 45.99 | 47.74 | 48.32 |
| Vinyl acetylene conversion, percent | | 8.9 | 13.0 | 11.3 | 11.3 | 18.3 | 37.8 | 42.0 | 57.4 | | | 23.3 | 40.5 | 44.8 | 50.0 |
| Predicted vinyl acetylene conversion | | 37.0 | 16.8 | 32.8 | 39.7 | 18.7 | 37.8 | 48.1 | 59.9 | | | 13.2 | 43.8 | 55.6 | 70.5 |

Virgin catalyst was also tested to try to determine the particular mechanism of the water-wash. Virgin catalyst soaked in a sodium nitrite stream containing a great number of impurities and in a sodium nitrite solution containing essentially only sodium nitrite showed no evidence of activity loss. Sodium nitrite is commonly used in butadiene units to inhibit polymerization. Subsequently, tests of virgin catalyst soaked in sodium sulfate solution showed complete activity loss. It is known that both nitrite and sulfate ions are present in plant streams and it thus appears that the sulfate ion can deactivate the catalyst. It is also known that other ions and/or metals are present in the plant streams and it is not known whether any of these other ions and/or metals also deactivate the catalyst. As noted before however, the regeneration by burning followed by a water wash will result in the restoration of catalyst hydrogenation activity where the conventional burning regeneration procedures fail.

It is claimed:

1. A method for regenerating platinum group metal-alpha alumina catalyst employed in the selective hydrogeneation of acetylenic hydrocarbons in a hydrocarbon diene-rich stream, in the presence of hydrogen which comprises burning from the catalyst carbonaceous material deposited thereon during use in said selective hydrogenation, cooling the catalyst and washing to cooled catalyst.

to the catalyst, are sufficiently low as not to be deleterious to the usefulness of the catalyst in said hydrogenation, to remove water-soluble impurities from the catalyst.

7. The method of claim 6 wherein the platinum-group metal is palladium.

8. The method of claim 6 wherein the water is distilled.

9. The method of claim 6 wherein the water is contacted with said catalyst for at least about 15 minutes after the wash effluent is clear.

10. The method of claim 9 wherein the water is distilled.

11. A method for regenerating a palladium-alpha alumina catalyst employed in selectively hydrogenating $C_4$-acetylene in a butadiene-rich stream in the presence of hydrogen, to restore activity and selectivity to the catalyst which comprises terminating contact between the butadiene-rich stream and the catalyst bearing carbonaceous material deposited thereon during use in said hydrogenation, heating the catalyst with steam to a temperature of from about 650 to 850° F., contacting the catalyst with air and steam to raise the effluent temperature from the catalyst to about 800 to 1000° F., while burning carbonaceous material therefrom, maintaining contact of the catalyst with air until no exotherm is evident, cooling the catalyst in steam to about 300° F., further cooling the catalyst to about 120° F. and washing the cooled catalyst with liquid phase distilled water to remove water-soluble impurities from the catalyst.

References Cited

UNITED STATES PATENTS

| | | |
|---|---|---|
| 2,242,771 | 5/1941 | Baker, Jr. et al. ____ 252—416 X |
| 2,278,836 | 4/1942 | Day _____ 252—416 |
| 2,310,962 | 2/1943 | Lassiat _____ 252—416 X |
| 2,414,736 | 1/1947 | Gray _____ 252—420 X |
| 3,075,917 | 1/1963 | Kronig et al. ____ 260—681.5 X |
| 3,112,278 | 11/1963 | Jenney et al. _____ 252—420 |
| 3,113,980 | 12/1963 | Robinson et al. __ 260—681.5 X |
| 3,281,489 | 10/1966 | Goering _____ 260—681.5 |
| 3,328,479 | 6/1967 | Schneider et al. ____ 260—681.5 |
| 3,342,891 | 9/1967 | Poohs et al. _____ 260—681.5 |
| 3,524,822 | 8/1970 | Frankovich et al. ____ 252—420 |

FOREIGN PATENTS

| | | |
|---|---|---|
| 974,038 | 11/1964 | Great Britain _____ 260—681.5 |

DANIEL E. WYMAN, Primary Examiner

P. E. KONOPKA, Assistant Examiner

U.S. Cl. X.R.

252—410; 260—681.5